United States Patent
Lee et al.

(10) Patent No.: US 11,476,474 B2
(45) Date of Patent: Oct. 18, 2022

(54) HEAT EXCHANGE APPARATUS FOR COOLING WATER OF FUEL CELL AND FUEL CELL SYSTEM INCLUDING THE SAME

(71) Applicants: HYUNDAI MOTOR COMPANY, Seoul (KR); KIA MOTORS CORPORATION, Seoul (KR)

(72) Inventors: Nam Woo Lee, Hwaseong-si (KR); Hyuck Roul Kwon, Yongin-si (KR); Sung Wook Na, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 65 days.

(21) Appl. No.: 16/751,320

(22) Filed: Jan. 24, 2020

(65) Prior Publication Data
US 2020/0161676 A1   May 21, 2020

Related U.S. Application Data

(62) Division of application No. 15/802,203, filed on Nov. 2, 2017, now abandoned.

(30) Foreign Application Priority Data

Dec. 14, 2016 (KR) .................. 10-2016-0170569

(51) Int. Cl.
   *H01M 8/04* (2016.01)
   *H01M 8/04007* (2016.01)
   (Continued)

(52) U.S. Cl.
   CPC ........ *H01M 8/04052* (2013.01); *F28D 20/02* (2013.01); *F28D 20/021* (2013.01);
   (Continued)

(58) Field of Classification Search
   CPC ....... Y02E 60/14; F28D 20/02; F28D 20/021; F28D 20/028; F28D 2020/0082;
   (Continued)

(56) References Cited

U.S. PATENT DOCUMENTS 4,127,161 A   11/1978 Clyne et al.
4,193,441 A   3/1980 Scaringe
(Continued)

FOREIGN PATENT DOCUMENTS

DE    102011102138 A1 * 11/2012   ......... F28D 20/0056
DE    10 2011 083 145 A1   3/2013
(Continued)

OTHER PUBLICATIONS

Anonymous, In Silico, "Functional Microcapsules," New Ways to New Materials, pp. 1-24.
(Continued)

*Primary Examiner* — Eric S Ruppert
(74) *Attorney, Agent, or Firm* — Morgan, Lewis & Bockius LLP

(57) ABSTRACT

A heat exchange apparatus for cooling water of a fuel cell includes a body, through which a cooling water pipe having cooling water flowing therethrough to be supplied to a fuel cell stack, passes; and a heat accumulator provided in an interior of the body and filled with a PCM heat accumulation material that exchanges heat with the cooling water. The body includes a medium space provided between the cooling water pipe and the heat accumulator such that the heat accumulator is spaced apart from the cooling water pipe. The PCM heat accumulation material exchanges heat with the cooling water by a medium of the medium space.

6 Claims, 12 Drawing Sheets

(51) Int. Cl.
  *F28D 20/02* (2006.01)
  *H01M 8/04029* (2016.01)
  *F28D 21/00* (2006.01)
  *F28D 20/00* (2006.01)
(52) U.S. Cl.
  CPC ... *H01M 8/04029* (2013.01); *H01M 8/04067* (2013.01); *F28D 2020/0013* (2013.01); *F28D 2021/0043* (2013.01); *Y02E 60/14* (2013.01)
(58) Field of Classification Search
  CPC ......... F28F 2013/008; H01M 8/04052; H01M 8/04029; H01M 8/04067
  See application file for complete search history.

(56) References Cited

U.S. PATENT DOCUMENTS

| | | | |
|---|---|---|---|
| 5,239,839 | A | 8/1993 | James |
| 5,524,453 | A | 6/1996 | James |
| 5,680,898 | A | 10/1997 | Rafalovich et al. |
| 5,687,706 | A | 11/1997 | Goswami et al. |
| 7,147,071 | B2 | 12/2006 | Gering et al. |
| 7,735,461 | B2 | 6/2010 | Vetrovec |
| 2003/0138688 | A1 | 7/2003 | Hattori et al. |
| 2009/0260781 | A1 | 10/2009 | Ullman et al. |
| 2011/0197603 | A1 | 8/2011 | Brown |
| 2012/0138275 | A1 | 6/2012 | Biggin et al. |
| 2012/0168111 | A1 | 7/2012 | Soukhojak et al. |
| 2012/0241120 | A1 | 9/2012 | Hagel et al. |
| 2012/0241122 | A1 | 9/2012 | Xiang et al. |
| 2013/0146000 | A1 | 6/2013 | Choi et al. |
| 2014/0305609 | A1 | 10/2014 | Guillaume et al. |
| 2016/0201995 | A1 | 7/2016 | Llena et al. |
| 2017/0306798 | A1* | 10/2017 | Cave .......................... F01K 7/16 |
| 2018/0175420 | A1 | 6/2018 | Lee et al. |

FOREIGN PATENT DOCUMENTS

| | | | |
|---|---|---|---|
| DE | 102015111235 A1 * | 9/2016 | |
| JP | 61-173085 A | 8/1986 | |
| JP | H10-246584 A | 9/1998 | |
| JP | 2001-317887 A | 11/2001 | |
| JP | 2008-019555 A | 1/2008 | |
| JP | 2009-275518 A | 11/2009 | |
| JP | 2009-298190 A | 12/2009 | |
| JP | 2010-127121 A | 6/2010 | |
| JP | 2011-075192 A | 4/2011 | |
| JP | 4844797 B2 | 12/2011 | |
| JP | 2013-181692 A | 9/2013 | |
| JP | 2014-178100 A | 9/2014 | |
| KR | 2003-0041891 A | 5/2003 | |
| KR | 20-0351509 Y1 | 5/2004 | |
| KR | 10-1102333 B1 | 1/2012 | |
| KR | 10-2012-0045001 A | 5/2012 | |
| KR | 10-1157860 B1 | 6/2012 | |
| KR | 10-2013-0041407 A | 4/2013 | |
| KR | 10-1305199 B1 | 9/2013 | |
| KR | 10-2013-0116247 A | 10/2013 | |
| KR | 10-1318620 B1 | 10/2013 | |
| KR | 10-1426284 B1 | 8/2014 | |
| KR | 10-2015-0024624 A | 3/2015 | |
| KR | 10-1620107 B1 | 5/2016 | |
| KR | 10-2018-0068659 A | 6/2018 | |
| KR | 10-2018-0069618 A | 6/2018 | |

OTHER PUBLICATIONS

Office Action issued in corresponding U.S. Appl. No. 15/798,027 dated May 14, 2019.
Office Action issued in corresponding U.S. Appl. No. 15/802,203 dated Oct. 25, 2019.
Office Action issued in corresponding U.S. Appl. No. 15/798,027 dated Dec. 6, 2019.
Notice of Allowance issued in corresponding U.S. Appl. No. 15/798,027 dated Aug. 12, 2020.
Notice of Allowance issued in corresponding Korean Patent Application No. 10-2016-0170568 dated Aug. 30, 2022, with English translation.

* cited by examiner

HEAT EXCHANGE APPARATUS FOR COOLING WATER OF FUEL CELL AND FUEL CELL SYSTEM INCLUDING THE SAME

CROSS-REFERENCE TO RELATED APPLICATION

This application is the divisional application of U.S. patent application Ser. No. 15/802,203 filed on Nov. 2, 2017, which is based on and claims the benefit of priority to Korean Patent Application No. 10-2016-0170569, filed on Dec. 14, 2016, with the Korean Intellectual Property Office, the disclosures of which are incorporated herein in their entirety by reference.

TECHNICAL FIELD

The present disclosure relates to a heat exchange apparatus for cooling water of a fuel cell and a fuel cell system including the same.

BACKGROUND

A fuel cell is an apparatus that converts chemical energy stored in a hydrocarbon or a hydrogen fuel to electrical energy through an electrochemical reaction with air. A polymer electrolyte fuel cell (PEFC) used in vehicles or the like is a fuel cell that uses a polymer as an electrolyte, and is operated at a temperature of not more than 100° C. Hydrogen ions produced by an anode of a fuel cell stack flow to a cathode through an electrolyte, and generate electricity while reacting with oxygen in the cathode to generate water.

However, a process of generating electricity in the fuel cell is a heat emitting reaction, and the temperature of the fuel cell stack may exceed 100° C. depending on the operation of the fuel cell. Accordingly, it is necessary to supply cooling water into the fuel cell stack to maintain the temperature of the fuel cell stack at not more than 100° C.

Then, in order to adjust the temperature of the cooling water, heat may be emitted or supplied while the cooling water supplied to the fuel cell stack passes through a heat exchanger, and a PCM heat accumulation material may be used in the heat exchanger. The PCM is a material, a phase of which is changed depending on temperature, and almost all materials in the nature may be PCMs.

Because the PCM absorbs or emits a large amount of thermal energy when the phase of the PCM is changed, it may be used to accumulate or emit heat in the fuel cell system. That is, the PCM is used as a heat accumulation material to supply heat accumulated in the PCM heat accumulation material or accumulate the heat of the cooling water in the PCM heat accumulation material.

However, the phase change temperatures of the PCMs are determined in advance and cannot be changed. Accordingly, even though the user found a PCM having suitable phase change energy, it is difficult to use the PCM if the phase change temperature of the PCM does not satisfy a required condition.

Further, the temperature of the cooling water supplied to the fuel cell stack during an operation of the fuel cell system has to be changed depending on situations. However, in the conventional heat exchanger, because the heat transfer rates of the PCM heat accumulation material and the cooling water cannot be changed, the temperature of the cooling water supplied to the fuel cell stack cannot be adjusted depending on situations.

SUMMARY

The present disclosure provides a heat exchange apparatus that may employ a PCM, a phase of which is changed, as a heat accumulation material.

The present disclosure also provides a heat exchange apparatus that may easily adjust the temperature of cooling water supplied to a fuel cell stack by using a PCM, a phase of which is changed at a desired temperature, as a heat accumulation material.

The technical objects of the present disclosure are not limited to the above-mentioned one, and the other unmentioned technical objects will become apparent to those skilled in the art from the following description.

In accordance with an aspect of the present disclosure, a heat exchange apparatus for cooling water of a fuel cell, the heat exchange apparatus including a body, through which a cooling water pipe having cooling water flowing therethrough to be supplied to a fuel cell stack, passes, and a heat accumulator provided in an interior of the body and filled with a PCM heat accumulation material that is to exchange heat with the cooling water, wherein the body includes a medium space provided between the cooling water pipe and the heat accumulator such that the heat accumulator is spaced apart from the cooling water pipe, and wherein the PCM heat accumulation material exchanges heat with the cooling water by a medium of the medium space.

In an example, the PCM heat accumulation material is a material, a phase of which is changed at an operation temperature that is lower than a reference temperature due to a spacing interval between the heat accumulator and the cooling water pipe, the reference temperature is a phase change temperature required by the PCM heat accumulation material when the heat accumulator is located to contact the cooling water pipe.

In an example, the spacing interval may be determined based on a heat transfer rate between the heat accumulator filled with the PCM heat accumulation material, a phase of which is changed at the operation temperature, and the cooling water pipe.

In an example, the body may be provided such that the heat transfer rate between the heat accumulator and the cooling water pipe may be adjusted by changing the spacing interval.

In an example, the spacing interval may be changed such that a temperature of the cooling water discharged from the body is not more than a limit temperature corresponding to a maximum spacing interval and not less than the operation temperature.

In an example, the interior of the body may include a first area provided with the medium space, the body may include a first outer wall part of an outer wall that defines the interior of the body, which first outer wall part is located to correspond to the first area and is elastically deformed, and the first outer wall part may be elastically deformed as a pressure change of the medium space moves the heat accumulator in a first direction that is far away from the cooling water pipe or a second direction that is opposite to the first direction.

In an example, the heat exchange apparatus further may include a pump configured to inject fluid into the medium space or suction fluid from the medium space to adjust an internal pressure of the medium space.

In an example, the pump may be an air compressor configured to supply air to the fuel cell stack.

In an example, the interior of the body may include a first area provided with the medium space, and a second area that is adjacent to the first area and provided with the heat accumulator, the body may include a first outer wall part of an outer wall that defines the interior of the body, the first outer wall part located to correspond to the first area and elastically deformed, and a second outer wall part extending from the first outer wall part and located to correspond to the second area, and the first outer wall part may be elastically deformed as a movement part connected to the second outer wall part moves the second outer wall part in a first direction moving away from the cooling water pipe or a second direction that is opposite to the first direction.

In an example, the heat accumulator may include a heat transfer member surrounding at least a portion of the PCM heat accumulation material to transfer heat received from the cooling water to the PCM heat accumulation material by the medium of the medium space or receive heat, which is to be transferred to the cooling water, from the PCM heat accumulation material by the medium of the medium space.

In an example, the interior of the body may include a first area provided with the medium space, and a second area that is spaced apart from the cooling water pipe through the medium space and provided with the heat accumulator, the heat transfer member may include a first member extending along a lengthwise direction of the cooling water pipe to differentiate the first area from the second area, and a plurality of second members extending from the first member in a direction moving away from the cooling water pipe and spaced apart from each other in the lengthwise direction of the cooling water pipe, and the PCM heat accumulation material may be filled in spaces defined by the first member and the second members in the second area.

In an example, the body may have a tubular shape having a hollow, into which the cooling water pipe is inserted, and an inner surface spaced apart from an outer surface of the cooling water pipe to define the medium space in the hollow, and the heat accumulator may be provided in a lengthwise direction of the body along the inner surface of the body to be spaced apart from the cooling water pipe in a radial direction of the body.

In an example, the cooling water pipe may be elastically deformed depending on a change in an internal pressure thereof, and the spacing interval between the heat accumulator and the cooling water pipe may be changed as the cooling water pipe expands or contracts in the radial direction of the body due to the change in the internal pressure of the cooling water pipe.

In an example, the heat exchange apparatus may further include a body cover accommodating the body in an interior of the body cover and having an inner surface spaced apart from an outer surface of the body to provide a supplementary space between the body cover and the body, wherein fluid in the medium space flows to the supplementary space through a connection passage connecting the medium space and the supplementary space as the cooling water pipe expands, and wherein fluid in the supplementary space flows to the medium space through the connection passage as the cooling water pipe contracts.

In an example, the body cover may be elastically deformed as the fluid is introduced into or discharged from the supplementary space.

In accordance with another aspect of the present disclosure, there is provided a heat exchange apparatus for cooling water of a fuel cell, the heat exchange apparatus including a body including a first pipe having a first hollow therein, and a second pipe having a second hollow therein, the second pipe provided in the first hollow of the first pipe to be spaced inwards apart from an inner surface of the first pipe, and a heat accumulator provided in the second hollow of the second pipe and filled with a PCM heat accumulation material to exchange heat with cooling water, which flows along a flow space defined between the first pipe and the second pipe to be supplied to a fuel cell stack. The body further includes a medium space provided between the second pipe and the heat accumulator such that the heat accumulator is located to be spaced inwards apart from the second pipe, and wherein the PCM heat accumulation material exchanges heat with the cooling water by a medium of the medium space.

In an example, the second pipe may be elastically deformed as an internal pressure of the flow space is changed, and a spacing interval between the heat accumulator and the second pipe may be changed as the second pipe expands or contracts in a radial direction of the second pipe.

In an example, the heat exchange apparatus may further include a body cover accommodating the body in an interior of the body cover and having an inner surface spaced apart from an outer surface of the body to provide a supplementary space between the body cover and the body, fluid in the medium space may flow to the supplementary space through a connection passage connecting the medium space and the supplementary space as the second pipe is contracted, and fluid in the supplementary space may flow to the medium space through the connection passage as the second pipe is expanded.

In an example, the body cover may be elastically deformed as the fluid is introduced into or discharged from the supplementary space.

In accordance with another aspect of the present disclosure, there is provided a fuel cell system including a fuel cell stack including a fuel electrode and an air electrode, and a cooling water pipe configured to supply cooling water to the fuel cell stack, and a heat exchanger configured to exchange heat with the cooling water in an interior of the heat exchanger, wherein the heat exchanger includes a body, through which the cooling water pipe passes, and a heat accumulator provided in an interior of the body and filled with a PCM heat accumulation material that is to exchange heat with the cooling water, wherein the body further includes a medium space provided between the cooling water pipe and the heat accumulator such that the heat accumulator is located to be spaced apart from the cooling water pipe, and wherein the PCM heat accumulation material exchanges heat with the cooling water by a medium of the medium space.

In an example, the body may be provided such that a heat transfer rate between the heat accumulator and the cooling water pipe may be adjusted by changing a spacing interval between the heat accumulator and the cooling water pipe.

In an example, the fuel cell system may further include an adjustment device configured to adjust the spacing interval, and a controller configured to control the adjustment device, and the controller may adjust the spacing interval through the adjustment device such that the cooling water discharged from the body is at a target temperature between a first temperature that is a temperature of the cooling water discharged from the body when the spacing interval is changed to a maximum value, and a second temperature that is lower than the first temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
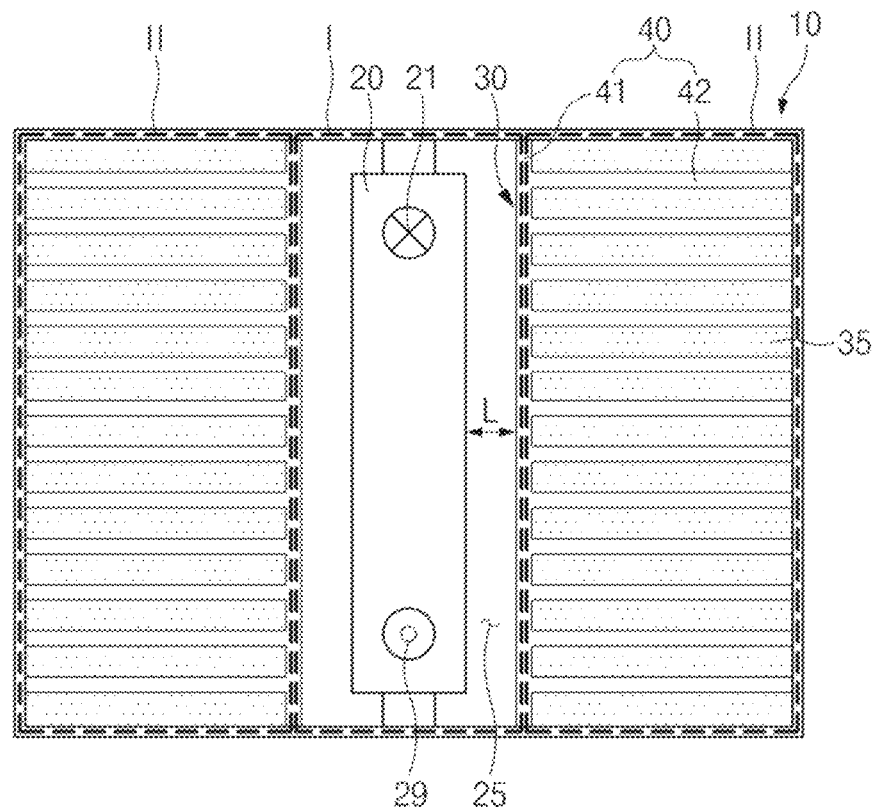
FIG. 1 is a plan view illustrating the interior of a heat exchange apparatus for cooling water of a fuel cell according to a first embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

Embodiment 1

FIG. 1 is a plan view illustrating the interior of a heat exchange apparatus for cooling water of a fuel cell according to the first embodiment of the present disclosure. The heat exchange apparatus for cooling water for a fuel cell is an apparatus that exchanges heat with cooling water, which is supplied to a fuel cell stack, to adjust the temperature of the cooling water. Hereinafter, the heat exchange apparatus for cooling water for a fuel cell according to the first embodiment of the present disclosure will be described.

The heat exchange apparatus for cooling water of a fuel cell includes a body 10, and a heat accumulator 30 provided in the interior of the body 10.

The cooling water pipe 20, having cooling water flowing therethrough, passes through an interior of the body 10. An inlet 21 through which cooling water is introduced and an outlet 29 through which cooling water is discharged may be formed in the cooling water pipe 20. The cooling water, which will be supplied to the fuel cell stack, is introduced into the cooling water pipe 20 through the inlet 21, and is discharged through the outlet 29 after flowing through the cooling water pipe 20.

The heat accumulator 30 is filled with a PCM heat accumulation material 35, and the PCM heat accumulation material 35 exchanges heat with the cooling water flowing through the cooling water pipe 20. Then, the heat accumulator 30 is spaced apart from the cooling water pipe 20. The body 10 includes a medium space 25 provided between the cooling water pipe 20 and the heat accumulator 30, which are spaced apart from each other. That is, the PCM heat accumulation material 35 exchanges heat with the cooling water by the medium of the medium space 25.

Hereinafter, for convenience of understanding, an area in which the medium space 25 is provided in the interior of the body 10 will be defined as a first area I, and an area which is separated from the cooling water pipe 20 through the medium space and in which the heat accumulator 30 is provided will be defined as a second area II.

The heat accumulator 30 may further include a heat transfer member 40 including a first member 41 and a plurality of second members 42. The heat transfer member 40 may transfer the heat received from the cooling water by the medium of the medium space 25 to the PCM heat accumulation material 35, or may receive the heat that is to be transferred to the cooling water by the medium of the medium space 25, from the PCM heat accumulation material 35.

The first member 41 extends in a lengthwise direction of the cooling water pipe 20 to classify the first area I and the second area II. The plurality of second members 42 may extend from the first member 41 towards a direction that is far away from the cooling water pipe 20, and may be spaced apart from each other in a lengthwise direction of the cooling water pipe 20. The plurality of second members 42 may be spaced apart from each other at the same interval along the lengthwise direction of the cooling water pipe 20 to transfer heat to the PCM heat accumulation material 35 uniformly as a whole.

The PCM heat accumulation material 35 may be filled in spaces defined by the first member 41 and the second members 42 in the second area II. In this way, as the heat transfer member 40 surrounds at least a portion of the PCM heat accumulation material 35 to efficiently transfer and receive heat to and from the PCM heat accumulation material 35. The heat transfer member 40 may employ heat dissipating fins having a high thermal conductivity to transfer and receive heat to and from the PCM heat accumulation material 35 more effectively.

Then, a heat transfer rate q″ between the PCM heat accumulation material 35 and the cooling water may be defined according to the following equation.

$$q'' = kA \frac{T_H - T_L}{L}$$

k denotes a thermal conductivity of a fluid filled in the medium space 25, A denotes a heat transfer area, TH denotes a temperature of a part of the cooling water pipe 20 and the heat accumulator 30, a temperature of which is relatively high, TL denotes a temperature of a part of the cooling water pipe 20 and the heat accumulator 30, a temperature of which is relatively low, and L denotes a spacing interval between the cooling water pipe 20 and the heat accumulator 30.

Then, it is assumed that the heat transfer area is constant. It is assumed that the cooling water pipe 20 has the same temperature as a whole due to the high thermal conductivity of the interior thereof. It can be seen that the whole heat accumulator 30 has the same temperature due to the heat transfer member 40. It is assumed that the medium space 25 is filled with a fluid, for example, air and the thermal conductivity k of the medium space 25 is constant.

Accordingly, a heat transfer rate q″ between the PCM accumulator 35 and the cooling water is inversely proportional to a spacing interval L between the PCM heat accumulation material 35 and the cooling water. A material, a phase of which is changed at an operation temperature that is lower than a reference temperature may be employed as the PCM heat accumulation material 35 due to the spacing interval L between the heat accumulator 30 and the cooling water pipe 20. The reference temperature refers to a phase change temperature that is required by the PCM heat accumulation material when the heat accumulator 30 and the cooling water pipe 20 are located to contact each other.

If a heat transfer rate between the PCM heat accumulation material, which contacts the cooling water pipe 20 and a phase of which is changed at the reference temperature, and the cooling water is substantially the same as a heat transfer rate between the PCM heat accumulation material, which is spaced apart from the cooling water pipe 20 and a phase of which is changed at an operation temperature, the PCM heat accumulation material 35 and the cooling water instead of the PCM heat accumulation material, a phase of which is changed at the reference temperature may be used by spacing the heat accumulator 30 and the cooling water pipe 20 from each other. Accordingly, a selection range of the PCM heat accumulation material 35 may be widened.

For example, it may be preferable that, when the cooling water flowing at 70° C. is to be cooled to 50° C., the PCM heat accumulation material, a phase of which is changed at 50° C. be located to contact the cooling water pipe 20, through which the cooling water flows. In this way, the phase of the PCM heat accumulation material will be changed at 50° C. while the heat of the cooling water is transferred to the PCM heat accumulation material, and the heat of the cooling water may be sufficiently transferred to the PCM heat accumulation material by using latent heat. Further, the cooling water may be cooled to 50° C. by a thermal equilibrium. Then, 50° C. becomes the reference temperature.

However, the same effect may be achieved by spacing the heat accumulator filled with the PCM heat accumulation material, a phase of which is changed at an operation temperature of 40° C. that is lower than the reference temperature, from the cooling water pipe.

Heat transfer rate is higher when the cooling water exchanges heat with the PCM accumulation material 35, a phase of which is changed at 40° C. while the cooling water contacts the PCM accumulation material 35 than when the cooling water exchanges heat with the PCM accumulation material, a phase of which is changed at 50° C. However, the PCM heat accumulation material, a phase of which is changed at 50° C., may be replaced by the PCM heat accumulation material, a phase of which is changed at 40° C., by spacing the cooling water pipe and the heat accumulator from each other so that the two heat transfer rates are substantially the same. That is, when it is not easy to use the PCM heat accumulation material, a phase of which is changed at 50° C. for various reasons, the PCM heat accumulation material, a phase of which is changed at 40° C., may be used.

Then, the spacing interval L between the cooling water pipe 20 and the heat accumulator 30 may be determined, based on the heat transfer rate between the heat accumulator 30 filled with the PCM heat accumulation material 35, a phase of which is changed at an operation temperature, and the cooling water pipe 20. If the spacing interval L is adjusted based on the operation temperature of the selected PCM heat accumulation material 35, the PCM heat accumulation material 35, a phase of which is changed at a desired operation temperature, may be selected. For example, when the PCM heat accumulation material, a phase of which is changed at 30° C. is used, the same effect may be achieved by enlarging the spacing interval as compared with the case in which the PCM heat accumulation material, a phase of which is changed at 40° C., may be used.

In this way, the selection range of the PCM heat accumulation material may be widened by selecting a PCM heat accumulation material, which may be easily used, from the PCM heat accumulation materials, phases of which are changed at various temperatures and setting a suitable spacing interval L based on the selected heat accumulation material.

Embodiment 2

Figure 2:
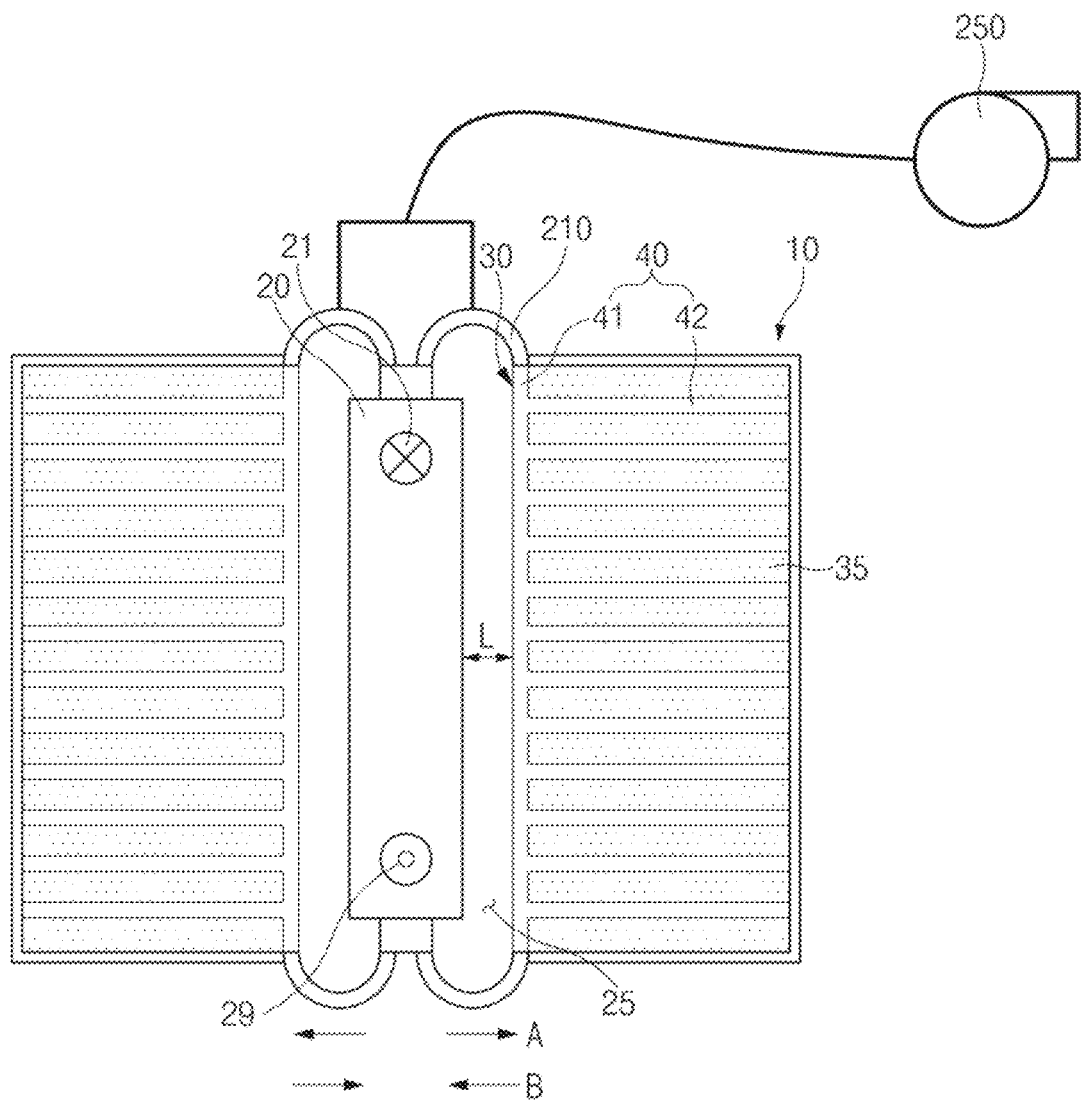
FIG. 2 is a plan view illustrating the interior of a heat exchange apparatus for cooling water of a fuel cell according to a second embodiment of the present disclosure.

FIG. 2 is a plan view illustrating the interior of a heat exchange apparatus for cooling water of a fuel cell according to the second embodiment of the present disclosure. Hereinafter, the heat exchange apparatus for cooling water for a fuel cell according to the second embodiment of the present disclosure will be described with reference to FIGS. 2 and 3.

In the body of the heat exchange apparatus according to the second embodiment of the present disclosure, the spacing interval L of the heat accumulator 30 and the cooling water pipe 20 of the heat exchange apparatus according to the first embodiment may vary. That is, the heat transfer rate between the cooling water and the PCM heat accumulation material 35 may be changed by varying the spacing interval L during an operation of the fuel cell, and accordingly, the temperature of the cooling water discharged from the body 10 may be adjusted.

Figure 3:
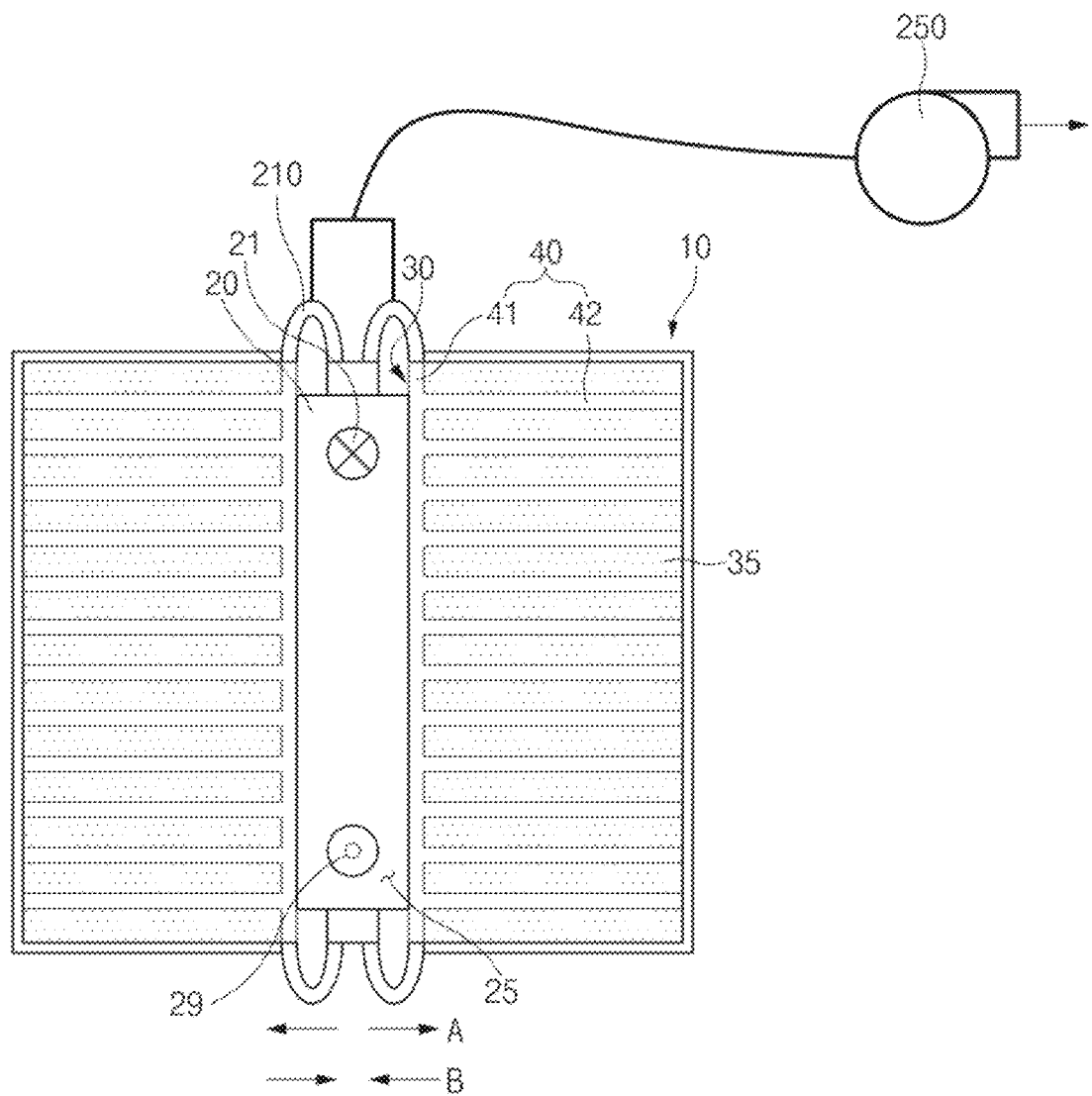
FIG. 3 is a plan view illustrating the interior of a heat exchange apparatus for cooling water of a fuel cell according to a second embodiment of the present disclosure.

FIG. 2 is a plan view illustrating that the spacing interval L is maximally changed. FIG. 3 is a plan view illustrating that the spacing interval L is decreased such that the cooling water pipe 20 and the heat accumulator 30 contact each other. Due to the restriction of the space in which the heat exchange apparatus is installed, an interval by which the heat accumulator 30 and the cooling water pipe 20 may be spaced apart from each other may be limited.

When the spacing interval L is maximally changed, the temperature of the cooling water discharged from the body 10 is called a limit temperature. If the cooling water pipe 20 and the heat accumulator 30 contact each other as the spacing interval L becomes gradually smaller, the temperature of the cooling water discharged from the body 10 may be an operation temperature.

That is, the spacing interval L may be changed such that the temperature of the cooling water discharged from the body 10 is not more than the limit temperature and not less than the operation temperature.

For changing the spacing interval L, the body 10 may be elastically deformed. In more detail, the body 10 may include a first outer wall part 210 that is elastically deformed. A part of an outer wall that defines the interior of the body 10, which part is located to correspond to the first area I, is referred to as the first outer wall part 210.

The first outer wall part 210 may be elastically deformed as the pressure change of the medium space 25 moves the heat accumulator 30 in a first direction A that is far away from the cooling water pipe 20 or in a second direction B that is opposite to the first direction. Although FIGS. 2 and 3 illustrate that the first outer wall part 210 is curved, the present disclosure is not limited thereto but any shape will do as long as the first outer wall part 210 may be elastically deformed.

The heat exchange apparatus for cooling water for a fuel cell according to the second embodiment of the present disclosure may further include a pump 250 to adjust an internal pressure of the medium space 25. The pump 250 may adjust the pressure of the medium space 25 by injecting fluid into the medium space 25 or suctioning the fluid in the medium space 25.

FIGS. 2 and 3 illustrates that the spacing interval L is changed by decreasing the pressure of the medium space 25 as the pump 250 suctions the fluid in the medium space 25. However, the spacing interval L may be changed by increasing the pressure of the medium space 25 as the fluid is injected into the medium space 25 through the pump 250 to the contrary.

Then, an air compressor for supplying air to the fuel cell stack may be used as the pump 250.

The heat exchange apparatus may further include a guide surface (not illustrated) that guides a movement path of the heat accumulator 30 so that the heat accumulator 30 may move while having the same spacing interval L along the lengthwise direction of the cooling water pipe 20.

In this way, in the heat exchange apparatus according to the second embodiment of the present disclosure, the heat transfer rate between the cooling water and the PCM heat accumulation material 35 may be adjusted by adjusting the spacing interval L between the cooling water pipe 20 and the heat accumulator 30 during an operation of the fuel cell, and accordingly, the temperature of the cooling water discharged from the body 10 and supplied to the fuel cell stack may be adjusted depending on situations.

Embodiment 3

Figure 4:
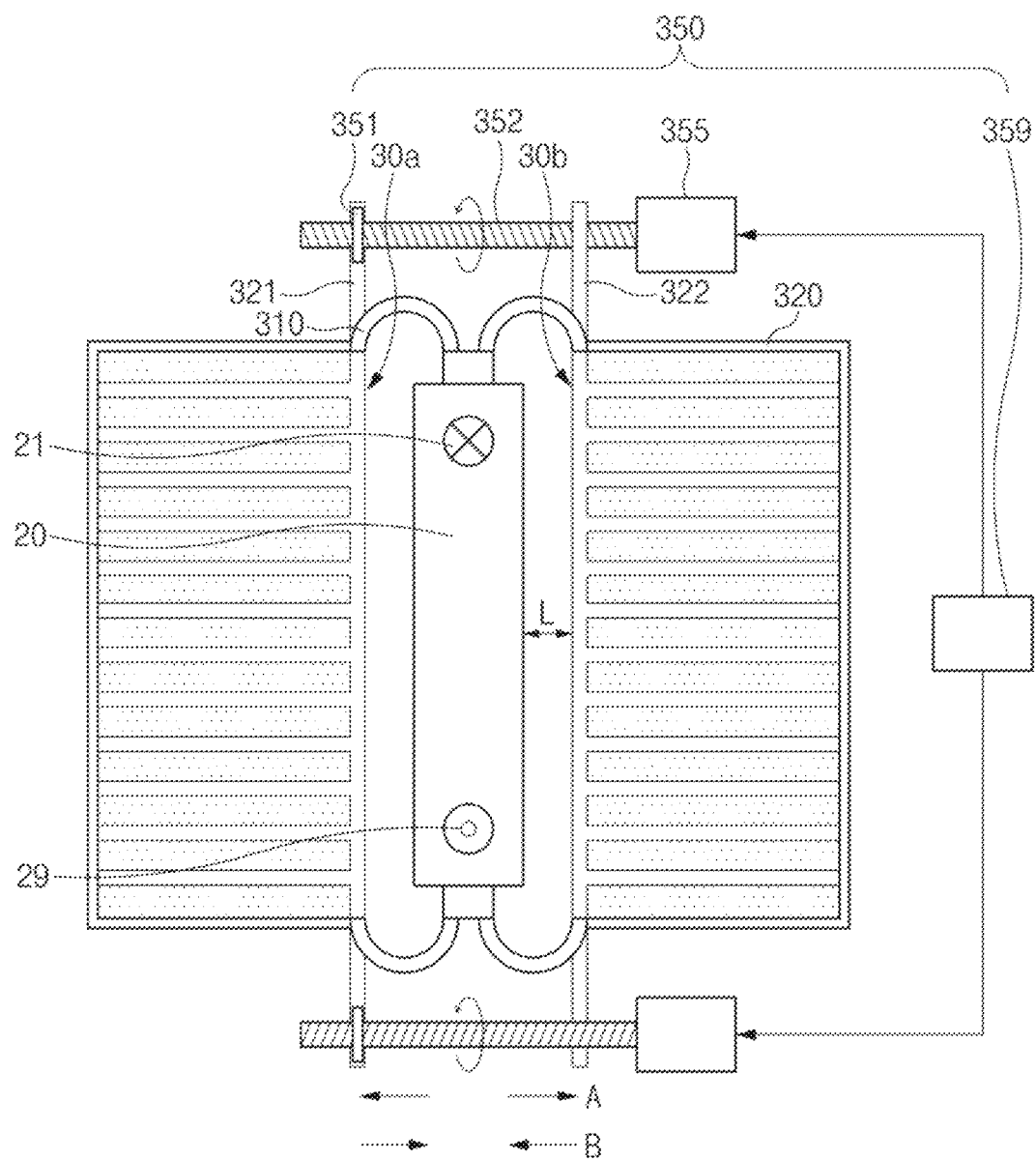
FIG. 4 is a plan view illustrating the interior of a heat exchange apparatus for cooling water of a fuel cell according to a third embodiment of the present disclosure.
Figure 5:
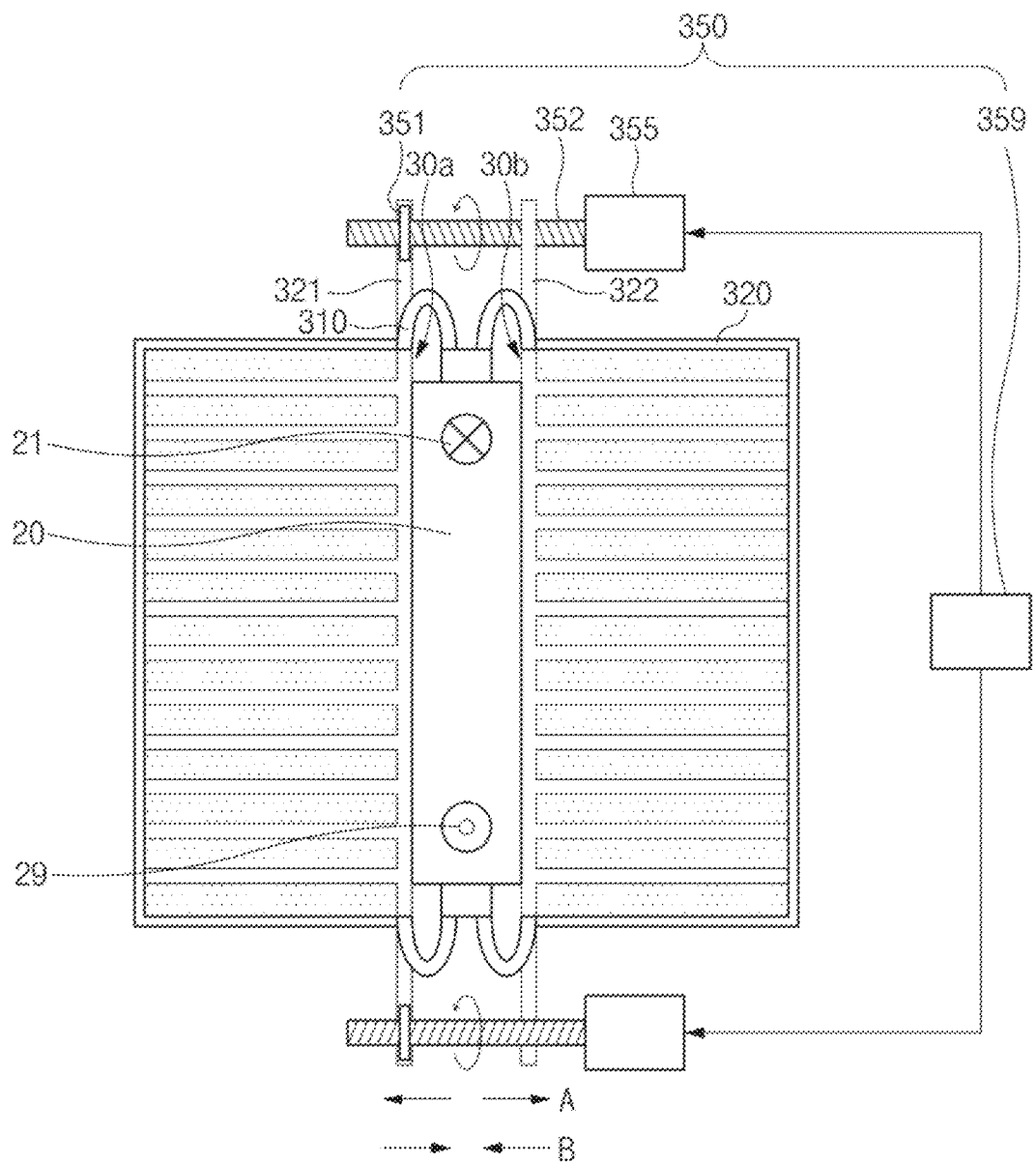
FIG. 5 is a plan view illustrating the interior of a heat exchange apparatus for cooling water of a fuel cell according to a third embodiment of the present disclosure.

FIGS. 4 and 5 are plan views illustrating the interior of a heat exchange apparatus for cooling water of a fuel cell according to the third embodiment of the present disclosure. FIG. 4 is a view illustrating a state in which the cooling water pipe 20 and the heat accumulator 30 are maximally separated from each other. FIG. 5 is a view illustrating a state in which the cooling water pipe 20 and the heat accumulator 30 contact each other. The heat exchange apparatus according to the third embodiment of the present disclosure is different from the heat exchange apparatus according to the second embodiment in that the spacing interval L is changed.

The heat exchange apparatus according to the third embodiment of the present disclosure may further include a second outer wall part 320, and a movement part 350 connected to the second outer wall part 320. A part of an outer wall that defines the interior of the body 10, which part extends from the first outer wall part to be located to correspond to a second area, is referred to as the second outer wall part 320.

As the movement part moves the second outer wall part 320 in a first direction A that is far away from the cooling water pipe 20 or in a second direction B that is opposite to the first direction, the first outer wall part 310 may be elastically deformed.

For example, as illustrated in FIGS. 4 and 5, heat accumulators 30a and 30b are located on opposite sides of the cooling water pipe 20, and the movement part 350 is coupled to a first extension 321 and a second extension 322 that extend from the second outer wall part 320 outwards to move the second outer wall part 320.

The movement part 350 may include a nut 351 inserted into the interior of any one of the first extension part 321 and the second extension part 322, and a bolt 352 passing through the first extension 321 and the second extension 322. The spacing interval L between the cooling water pipe 20 and the heat accumulator 30 may be changed as the second outer wall part 320 is moved as the bolt 352 is rotated. The bolt 352 may be rotated as the motor 355 controlled by the controller 359 is operated.

Embodiment 4

Figure 6:
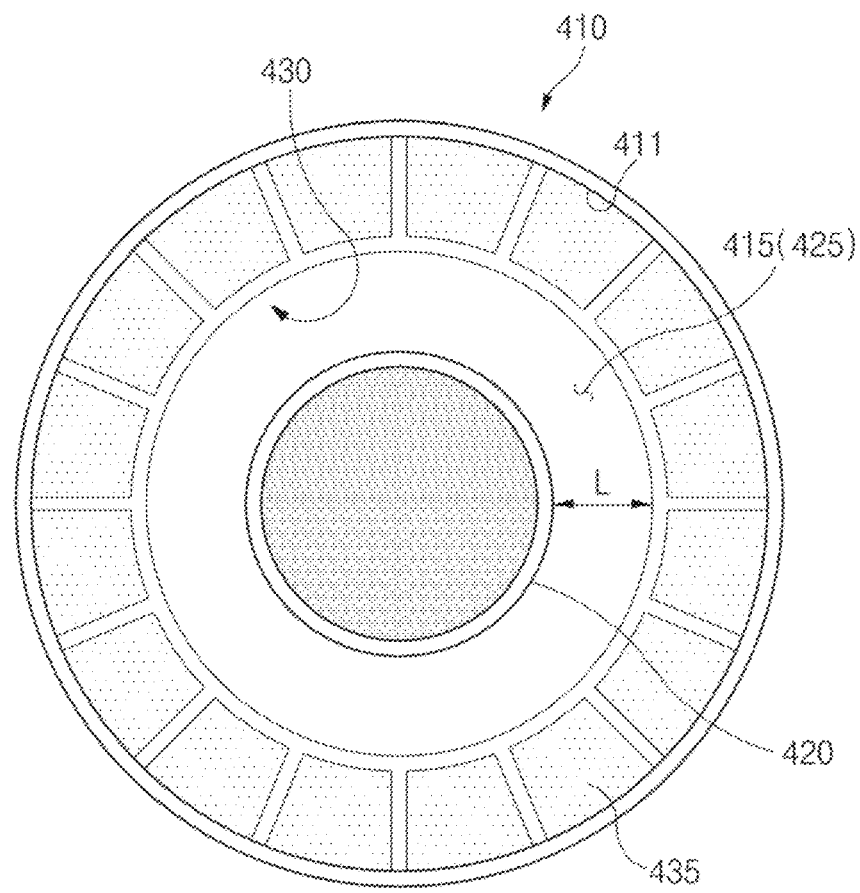
FIG. 6 is a sectional view illustrating a heat exchange apparatus for cooling water of a fuel cell according to a fourth embodiment of the present disclosure.

FIG. 6 is a plan view illustrating a heat exchange apparatus for cooling water of a fuel cell according to the fourth embodiment of the present disclosure. The heat exchange apparatus according to the fourth embodiment of the present disclosure is different from the heat exchange apparatus according to the first embodiment in that the body 410 has a tubular shape.

In more detail, the body 410 of the heat exchange apparatus according to the fourth embodiment of the present disclosure may have a hollow 415, through which a cooling water pipe 420 is inserted, and an inner surface 411 spaced apart from an outer surface of the cooling water pipe 420 to define a medium space 425 in the hollow 415.

The heat accumulator 430 may be provided in a lengthwise direction of the body 410 along the inner surface 411 of the body 410. Then, the heat accumulator 430 may be provided to be spaced apart from the cooling water pipe 420 in a radial direction of the body 410, and the body 410 may include a medium space 425 between the cooling water pipe 420 and the heat accumulator 430.

The PCM heat accumulation material 435 filled in the heat accumulator 430 may be employed as a material, a phase of which is changed at an operation temperature that is lower than a reference temperature, due to the spacing interval L between the heat accumulator 430 and the cooling water pipe 420. Further, the spacing interval L between the cooling water pipe 420 and the heat accumulator 430 may be determined, based on the heat transfer rate between the heat accumulator 430 filled with the PCM heat accumulation material 435, a phase of which is changed at an operation temperature, and the cooling water pipe 420. If the spacing interval L is adjusted based on the operation temperature of the selected PCM heat accumulation material 435, the PCM heat accumulation material 435, a phase of which is changed at a desired operation temperature, may be selected.

Embodiment 5

Figure 7:
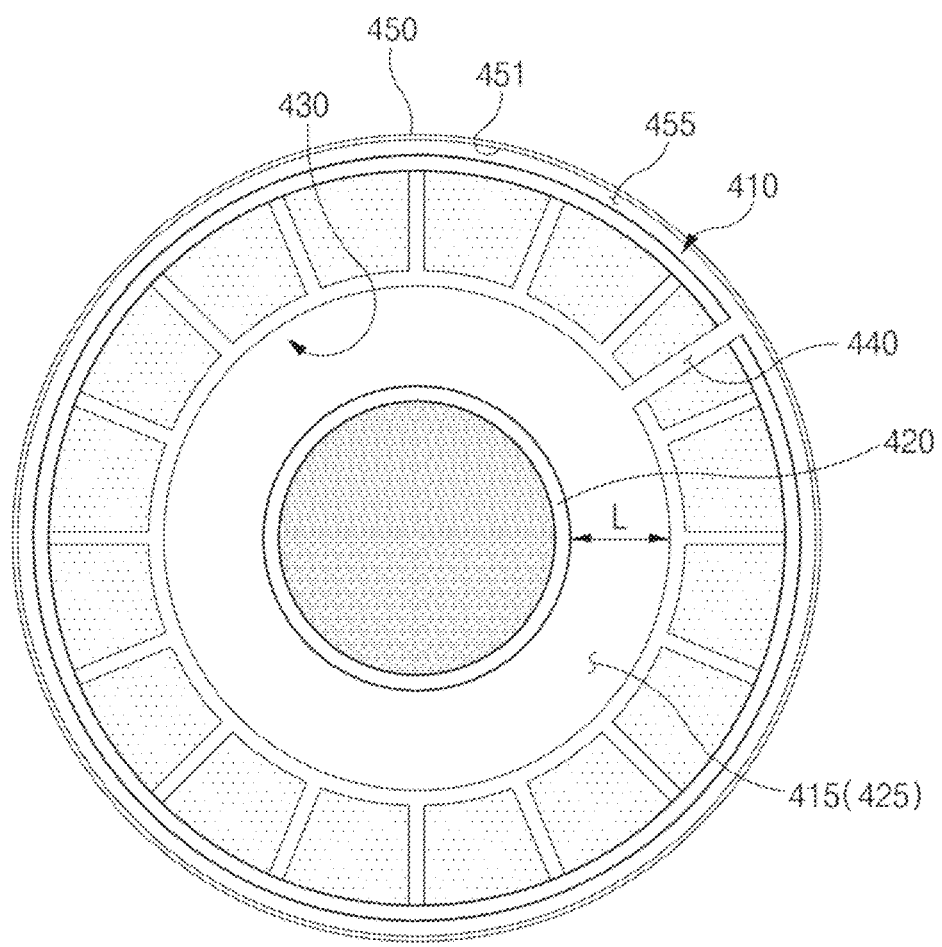
FIG. 7 is a sectional view illustrating a heat exchange apparatus for cooling water of a fuel cell according to a fifth embodiment of the present disclosure.
Figure 8:
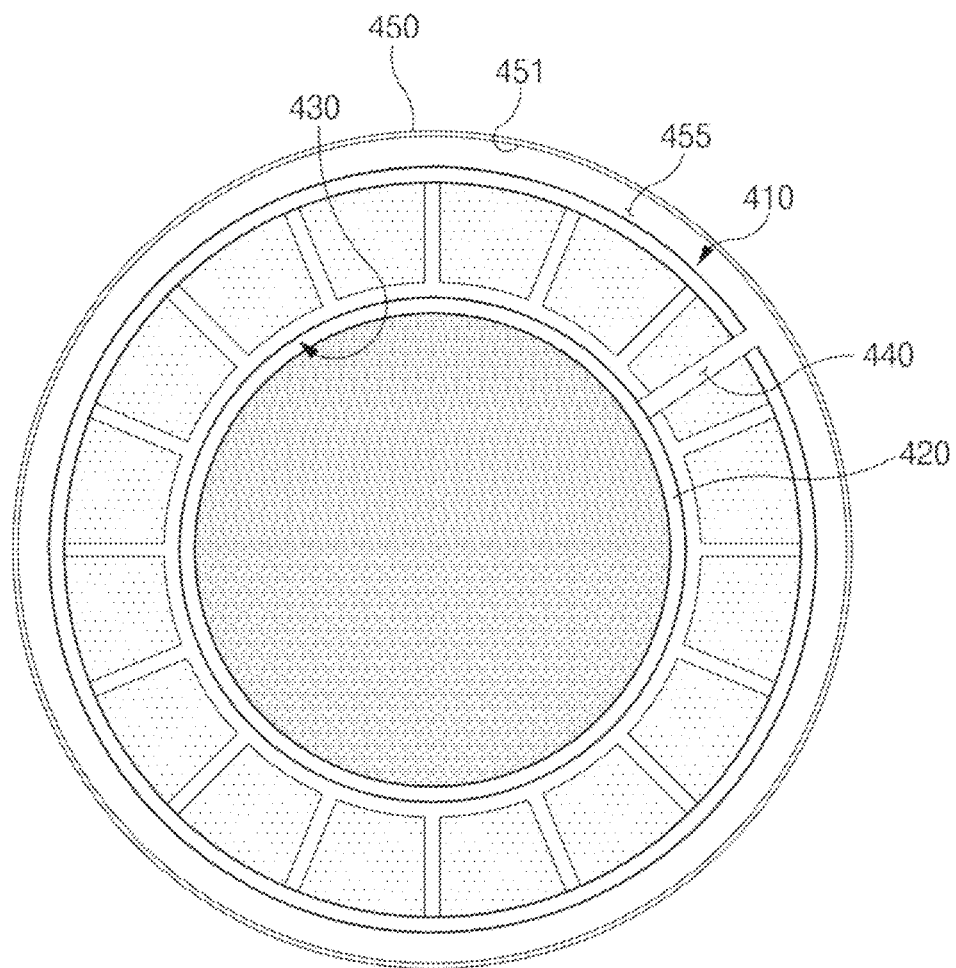
FIG. 8 is a sectional illustrating a heat exchange apparatus for cooling water of a fuel cell according to a fifth embodiment of the present disclosure.

FIGS. 7 and 8 are plan views illustrating the interior of a heat exchange apparatus for cooling water of a fuel cell according to the fifth embodiment of the present disclosure.

The heat exchange apparatus according to the fifth embodiment of the present disclosure is different from the heat exchange apparatus according to the fourth embodiment in that the spacing interval L of the heat exchange apparatus according to the fourth embodiment may be changed. Further, the heat exchange apparatus according to the fifth embodiment of the present disclosure are different form the heat exchange apparatuses according to the second and third embodiments of the present disclosure in that the spacing interval L may be changed.

FIG. 7 is a plan view illustrating that the spacing interval L between the cooling water pipe 420 and the heat accumulator 430 is maximal. FIG. 8 is a view illustrating that the cooling water pipe 420 and the heat accumulator 430 contact each other.

The cooling water pipe 420 may be elastically deformed as the pressure of the interior thereof is changed. For example, the pressure of the interior of the cooling water pipe 420 may be changed by changing the flow rate of the cooling water.

The cooling water pipe 420 may be expanded in a radial direction if the pressure of the interior thereof increases, and may be contracted in a direction that is opposite to the radial direction if the pressure of the interior thereof decreases. The spacing interval L between the heat accumulator 430 and the cooling water pipe 420 may be changed as the cooling water pipe 420 is expanded and contracted.

Accordingly, the heat transfer rate between the cooling water and the PCM heat accumulation material 435 may be adjusted if necessary by adjusting the internal pressure of the cooling water pipe 420 to adjust the spacing interval L.

However, a fluid, for example, air may be filled in the medium space 425, and the fluid in the medium space 425 may hamper expansion of the cooling water pipe 420 in a radial direction thereof. The heat exchange apparatus according to the fifth embodiment of the present disclosure may include a body cover 450 and a connection passage 440 to provide a space through which the fluid in the medium space 425 flows.

In more detail, the body cover 450 may accommodate the body 410, and may have an inner surface 451 spaced apart from the outer surface of the body 410 such that a supplementary space 455 may be provided between the inner surface 451 and the body 410.

If the cooling water pipe 420 is expanded in a radial direction thereof, the fluid in the medium space 425 may flow to the supplementary space 455 through the connection passage 440. The connection passage 440 is a passage that connects the medium space 425 and the supplementary space 455, and may pass through the body 410 and the heat accumulator 430. If the cooling water pipe 420 is expanded in a direction that is opposite to the radial direction thereof, the fluid in the supplementary space 455 may flow to the medium space 425 through the connection passage 440.

Then, the body cover 450 may be elastically deformed. The body cover 450 may be expanded as the fluid is introduced into the supplementary space 455, and may be contracted as the fluid is discharged from the supplementary space 455.

In this way, in the heat exchange apparatus according to the fifth embodiment of the present disclosure, the heat transfer rate between the cooling water and the PCM heat accumulation material 435 may be adjusted by adjusting the spacing interval L between the cooling water pipe 420 and the heat accumulator 430 during an operation of the fuel cell, and accordingly, the temperature of the cooling water discharged from the body 410 and supplied to the fuel cell stack may be adjusted depending on situations.

Embodiment 6

Figure 9:
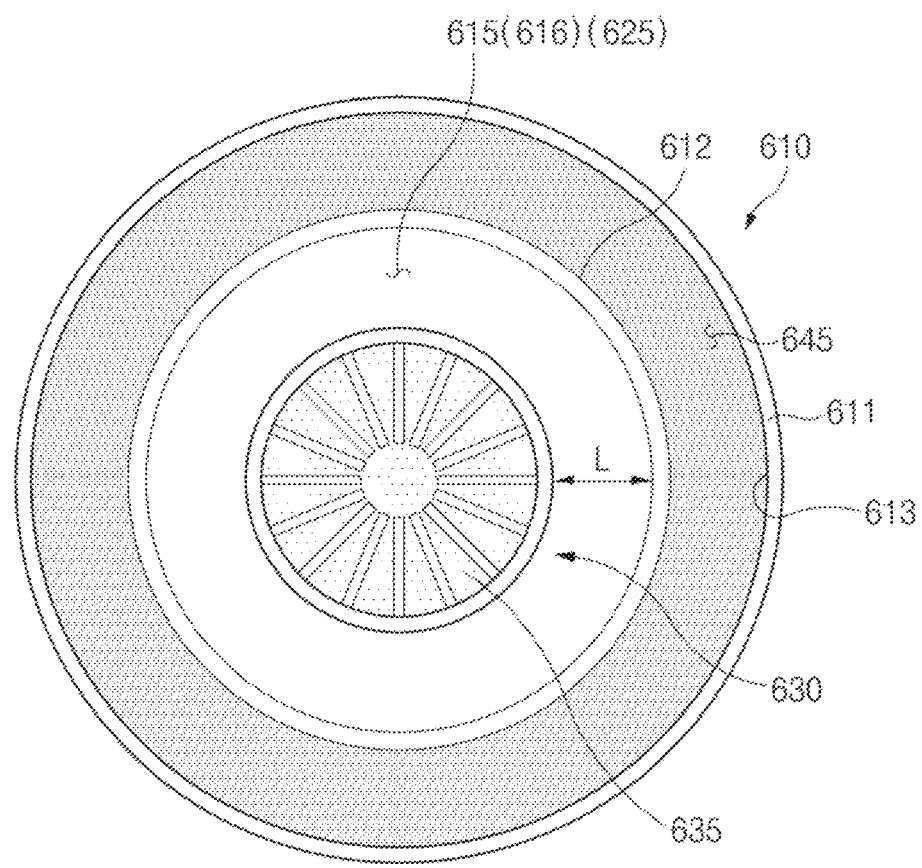
FIG. 9 is a sectional view illustrating a heat exchange apparatus for cooling water of a fuel cell according to a sixth embodiment of the present disclosure.

FIG. 9 is a sectional view illustrating a heat exchange apparatus for cooling water of a fuel cell according to the sixth embodiment of the present disclosure. The heat exchange apparatus according to the sixth embodiment is different from the heat exchange apparatus according to the fourth embodiment in an aspect of the shapes of a body 610 and a heat accumulator 630.

The heat exchange apparatus for cooling water of a fuel cell according to the sixth embodiment of the present disclosure includes a body 610 and a heat accumulator 630.

The body 610 includes a first pipe 611 and a second pipe 612. The first pipe 611 has a hollow 615 in the interior thereof, and the second pipe 612 is provided in the hollow 615 of the first pipe 611 to be spaced inwards apart from an inner surface 613 of the first pipe 611. The second pipe 612 has a hollow 616 in the interior thereof.

Then, the cooling water, which is to be supplied to the fuel cell stack, flows along a flow space 645 defined between the first pipe 611 and the second pipe 612.

The heat accumulator 630 filled with the PCM heat accumulation material 635 is provided in the hollow 616 of the second pipe 612. The PCM heat accumulation material 635 exchanges heat with the cooling water.

Then, the heat accumulator 630 is spaced inwards apart from the second pipe 612. Accordingly, the body 610 further includes a medium space 625 provided between the second pipe 612 and the heat accumulator 630. The PCM heat accumulation material 635 and the cooling water exchange heat by the medium of the medium space 625.

The effect achieved by locating the heat accumulator 630 and the second pipe 612 such that the heat accumulator 630 and the second pipe 612 are spaced apart from each other is the same as the effect achieved by locating the heat accumulator and the cooling water pipe such that the heat accumulator and the cooling water pipe are spaced apart from each other in the first and fourth embodiments of the present disclosure.

Embodiment 7

Figure 10:
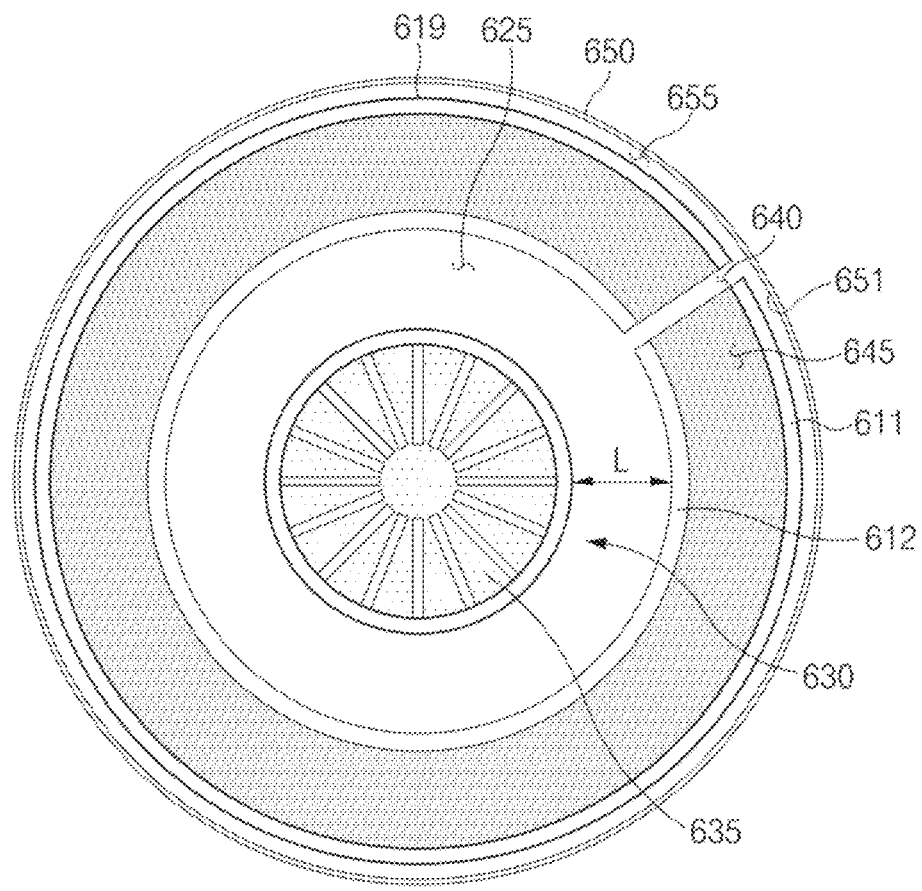
FIG. 10 is a sectional view illustrating a heat exchange apparatus for cooling water of a fuel cell according to a seventh embodiment of the present disclosure.
Figure 11:
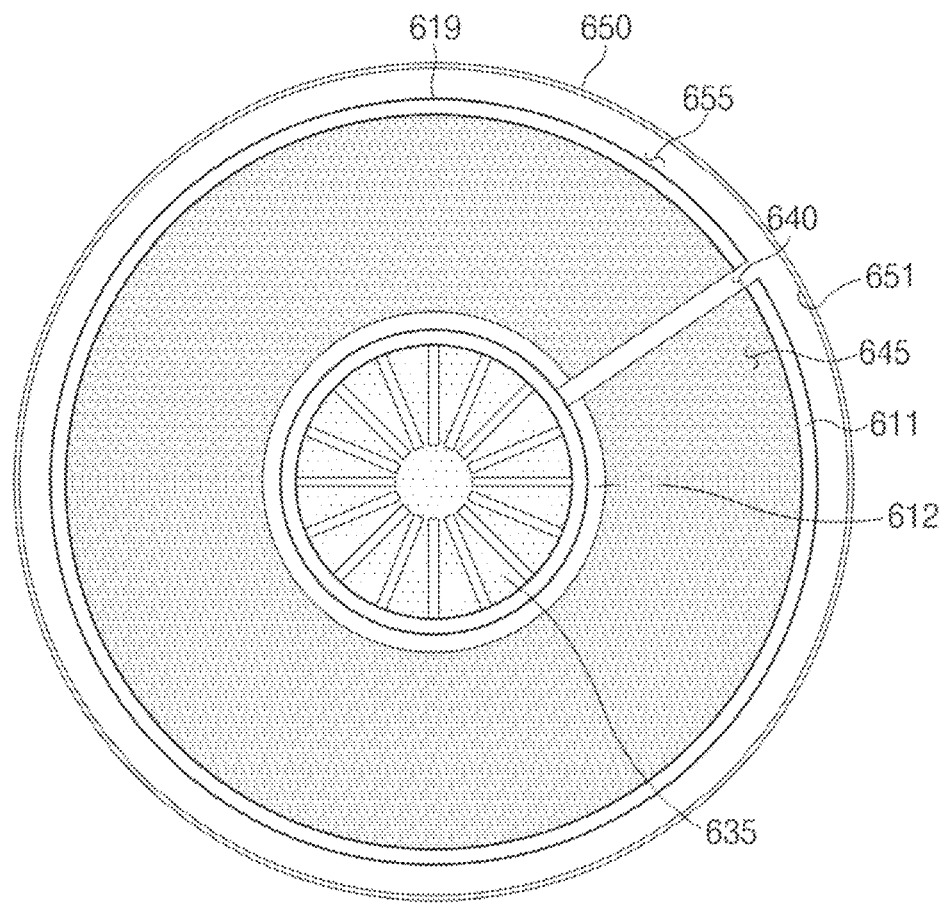
FIG. 11 is a sectional view illustrating a heat exchange apparatus for cooling water of a fuel cell according to the seventh embodiment of the present disclosure.

FIGS. 10 and 11 are sectional views illustrating the interior of a heat exchange apparatus for cooling water of a fuel cell according to the seventh embodiment of the present disclosure. The heat exchange apparatus according to the seventh embodiment is different from the heat exchange apparatus according to the sixth embodiment in that the spacing interval L between the heat accumulator 630 and the second pipe 612 may be changed. FIG. 10 is a view illustrating that the spacing interval L between the heat accumulator 630 and the second pipe 612 is maximal. FIG. 11 is a view illustrating that the heat accumulator 630 and the second pipe 612 contact each other.

The second pipe may be elastically deformed as the change of the pressure of the flow space 645 between the first pipe 611 and the second pipe 612 is changed. The second pipe 612 may be contracted in a direction that is opposite to the radial direction thereof if the pressure of the flow space 645 increases, and may be expanded in the radial direction if the pressure of the flow space 645 decreases.

The spacing interval L between the heat accumulator 630 and the second pipe 612 may be changed as the second pipe 612 is expanded or contracted due to the pressure change of the flow space 645. Accordingly, the heat transfer rate between the cooling water and the PMC heat accumulation material 635 may be adjusted by adjusting the flow rate or flow velocity of the cooling water flowing through the flow space 645 to adjust the spacing interval L.

Then, the heat exchange apparatus according to the seventh embodiment of the present disclosure may further include a body cover 650 and a connection passage 640. The body cover 650 may accommodate the body 610 therein, and may have an inner surface 651 spaced apart from the outer surface 619 of the body 610 such that a supplementary space 655 may be provided between the inner surface 651 and the body 610.

Referring to FIGS. 10 and 11, the fluid filled in the medium space 625 may flow to the supplementary space 655 through the connection passage 640 as the second pipe 612 is contracted. The connection passage 640 may pass through the first pipe 611 and the second pipe 612 to connect the medium space 625 and the supplementary space 655.

If the second pipe 612 is expanded, the fluid in the supplementary space 655 may flow to the medium space 625 through the connection passage 640.

Then, the body cover 650 may be elastically deformed as the fluid is introduced into or discharged from the supplementary space 655. The body cover 650 is expanded in a radial direction thereof if the fluid of the medium space 625 flows to the supplementary space 655 through the connection passage 640, and is contracted in a direction that is opposite to the radial direction if the fluid in the supplementary space 655 flows to the medium space 625.

The heat transfer rate between the cooling water and the PCM heat accumulation material 635 may be adjusted by adjusting the spacing interval L between the heat accumulator 630 and the second pipe 612 during an operation of the fuel cell, and accordingly, the temperature of the cooling water discharged from the body 610 and supplied to the fuel cell stack may be adjusted depending on situations.

Embodiment 8

Figure 12:
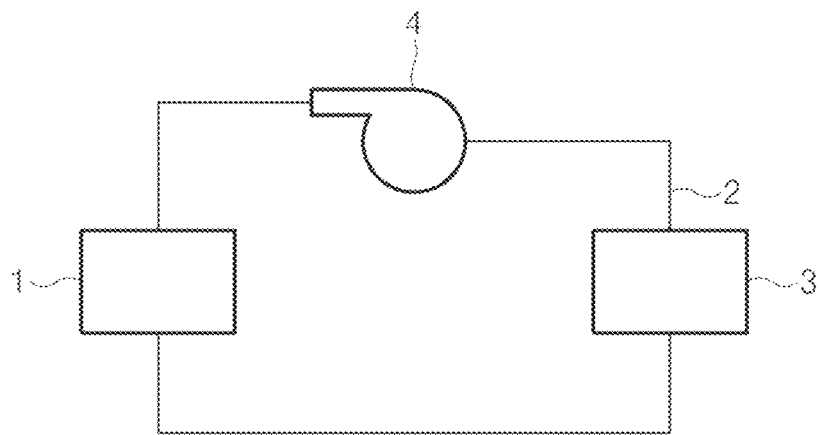
FIG. 12 is a diagram illustrating a fuel cell system according to an eighth embodiment of the present disclosure.

FIG. 12 is a diagram illustrating a fuel cell system according to the eighth embodiment of the present disclosure. The fuel cell system according to the eighth embodiment of the present disclosure includes a fuel cell stack 8, a cooling water pipe 2, a heat exchanger 3, and a pump 4.

The fuel cell stack 1 includes a fuel electrode (not illustrated) and an air electrode (not illustrated). The cooling water pipe 2 supplies cooling water to the fuel cell stack 1. Then, the cooling water may be suctioned through a pump 4 and may be supplied to the fuel cell stack 1.

The cooling water supplied to the fuel cell stack 1 exchanges heat in the interior of the heat exchanger 3. The heat exchange apparatuses for cooling water of a fuel cell according to the first to seventh embodiments of the present disclosure may be used as the heat exchanger 3 used for the fuel cell system according to the eighth embodiment of the present disclosure.

The fuel cell system according to the eighth embodiment of the present disclosure may further include an adjustment device (not illustrated) that adjusts the spacing intervals of the first to seventh embodiments, and a controller (not illustrated) that controls the adjustment device.

The controller may adjust the spacing interval by controlling the adjustment device such that the temperature of the cooling water discharged from the body becomes a target temperature. Then, the target temperature refers to a temperature between a first temperature that is a temperature of the cooling water discharged from the body when the spacing interval is changed to a maximum value, and a second temperature that is lower than the first temperature.

In this way, because the controller may adjust the temperature of the cooling water discharged from the body, the temperature of the cooling water supplied to the fuel cell stack 1 may be adjusted depending on moisture situations of the fuel cell stack 1, which is efficient.

For example, if it is determined to be a high moisture situation in which there is much moisture in the interior of the fuel cell stack 1 so that a flooding phenomenon may occur, the temperature of the cooling water supplied to the fuel cell stack 1 may be increased by enlarging the spacing interval. Further, when it is determined to be desirable to flow cooling water of a low temperature because the interior of the fuel cell stack 1 corresponds to a low moisture situation, more heat may be transferred from the cooling water to the PCM heat accumulation material by reducing the spacing interval.

Further, when it is necessary to coagulate the PCM heat accumulation material again after much heat is applied to the PCM heat accumulation material so that the phase of the PCM heat accumulation material is changed and the PCM heat accumulation material is solved, a period of time, for which the PCM heat accumulation material is coagulated, may be adjusted by adjusting the spacing interval.

According to the present disclosure, a PCM, a phase of which is changed at a desired temperature, may be used as a heat accumulation material, by properly setting a spacing interval between the heat accumulator filled with a PCM and the cooling water pipe, through which the cooling water flows.

Further, according to the present disclosure, the temperature of the cooling water supplied to the fuel cell stack may be easily adjusted by changing the spacing interval between the heat accumulator and the cooling water pipe.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A heat exchange apparatus for cooling water of a fuel cell, the heat exchange apparatus comprising:
   a body, through which a cooling water pipe passes, wherein cooling water that is to be supplied to a fuel cell stack flows through the cooling water pipe; and
   a heat accumulator arranged in an interior of the body and including therein a PCM heat accumulation material that is to exchange heat with the cooling water,
   wherein the body includes a medium space arranged between the cooling water pipe and the heat accumulator such that the heat accumulator is spaced apart from the cooling water pipe,
   wherein the PCM heat accumulation material exchanges heat with the cooling water by a medium of the medium space, wherein the interior of the body includes a first area provided with the medium space, wherein the body includes a first outer wall part of an outer wall that defines the interior of the body, which the first outer wall part is located to correspond to the first area and is elastically deformed, and wherein the first outer wall part is elastically deformed as a pressure change of the medium space moves the heat accumulator in a first direction that is far away from the cooling water pipe or a second direction that is opposite to the first direction.

2. The heat exchange apparatus of claim 1, wherein a phase of the PCM heat accumulation material is changed at a predetermined operation temperature that is lower than a reference temperature to which the cooling water to be discharged from the body is cooled during cooling of the cooling water by the PCM heat accumulation material.

3. The heat exchange apparatus of claim 2, wherein a spacing interval between the heat accumulator and the cooling water pipe is changed such that a temperature of the cooling water discharged from the body is not more than a limit temperature corresponding to a maximum spacing interval and not less than the operation temperature.

4. The heat exchange apparatus of claim 1, further comprising:
a pump configured to inject fluid into the medium space or suction fluid from the medium space to adjust an internal pressure of the medium space,
wherein the pump is an air compressor configured to supply air to the fuel cell stack.

5. The heat exchange apparatus of claim 1, wherein the heat accumulator includes:
a heat transfer member surrounding at least a portion of the PCM heat accumulation material to transfer heat received from the cooling water to the PCM heat accumulation material by the medium of the medium space or receive heat, which is to be transferred to the cooling water, from the PCM heat accumulation material by the medium of the medium space.

6. The heat exchange apparatus of claim 5, wherein the interior of the body further includes a second area that is spaced apart from the cooling water pipe through the medium space and provided with the heat accumulator,
wherein the heat transfer member includes:
a first member extending along a lengthwise direction of the cooling water pipe to differentiate the first area from the second area; and
a plurality of second members extending from the first member in a direction moving away from the cooling water pipe and spaced apart from each other in the lengthwise direction of the cooling water pipe, and
wherein the PCM heat accumulation material is filled in spaces defined by the first member and the second members in the second area.

* * * * *